United States Patent
Ahn

(10) Patent No.: US 10,803,753 B2
(45) Date of Patent: Oct. 13, 2020

(54) APPARATUS FOR MANAGING VEHICLE AND METHOD THEREFOR

(71) Applicant: REXGEN, Jeonju-si, Jeollabuk-do (KR)

(72) Inventor: Soon Hyun Ahn, Anyang-si (KR)

(73) Assignee: REXGEN, Jeonju-si, Jeollabuk-do (KR)

( * ) Notice: Subject to any disclaimer, the term of this patent is extended or adjusted under 35 U.S.C. 154(b) by 0 days.

(21) Appl. No.: 16/613,797

(22) PCT Filed: Nov. 22, 2017

(86) PCT No.: PCT/KR2017/013348
§ 371 (c)(1),
(2) Date: Nov. 15, 2019

(87) PCT Pub. No.: WO2018/212418
PCT Pub. Date: Nov. 22, 2018

(65) Prior Publication Data
US 2020/0175879 A1    Jun. 4, 2020

(30) Foreign Application Priority Data
May 15, 2017 (KR) .......... 10-2017-0060061

(51) Int. Cl.
| | |
|---|---|
| G08G 1/01 | (2006.01) |
| G08G 1/00 | (2006.01) |
| H04W 4/029 | (2018.01) |
| G06F 16/9537 | (2019.01) |
| G06F 16/29 | (2019.01) |
| H04W 4/021 | (2018.01) |

(52) U.S. Cl.
CPC .......... *G08G 1/207* (2013.01); *G06F 16/29* (2019.01); *G06F 16/9537* (2019.01); *H04W 4/021* (2013.01); *H04W 4/029* (2018.02)

(58) Field of Classification Search
CPC ...... G08G 1/207; G08G 1/0141; G08G 1/012; G08G 1/0129; G08G 1/205; G07C 5/008
See application file for complete search history.

(56) References Cited

U.S. PATENT DOCUMENTS

| | | | | |
|---|---|---|---|---|
| 5,900,825 | A | * 5/1999 | Pressel | ............... G01C 21/3629 |
| | | | | 340/905 |
| 2016/0379486 | A1* | 12/2016 | Taylor | .............. G08G 1/096844 |
| | | | | 340/905 |

FOREIGN PATENT DOCUMENTS

| | | | |
|---|---|---|---|
| KR | 10-2004-0045237 A | 6/2000 | |
| KR | 10-2011-0134049 A | 12/2011 | |
| KR | 10-1091562 B1 | 12/2011 | |
| KR | 10-1277803 B1 | 6/2013 | |

(Continued)

OTHER PUBLICATIONS

International Search Report for PCT/KR2017/013348 dated Feb. 6, 2018 from Korean Intellectual Property Office.

*Primary Examiner* — Toan N Pham
(74) *Attorney, Agent, or Firm* — Revolution IP, PLLC

(57) ABSTRACT

A vehicle management apparatus includes a collection unit that stores location information of at least one information acquisition means installed on a road and collects vehicle information on a vehicle identified from the information acquisition means; and a control unit that determines and informs whether or not location information of the vehicle is searched within a predetermined location range from the location information of the information acquisition means based on the vehicle information.

20 Claims, 3 Drawing Sheets

(56) References Cited

FOREIGN PATENT DOCUMENTS

| KR | 10-2015-0092803 A | 8/2015 |
|----|-------------------|--------|
| KR | 10-2015-0118010 A | 10/2015 |

* cited by examiner

[FIG. 1]
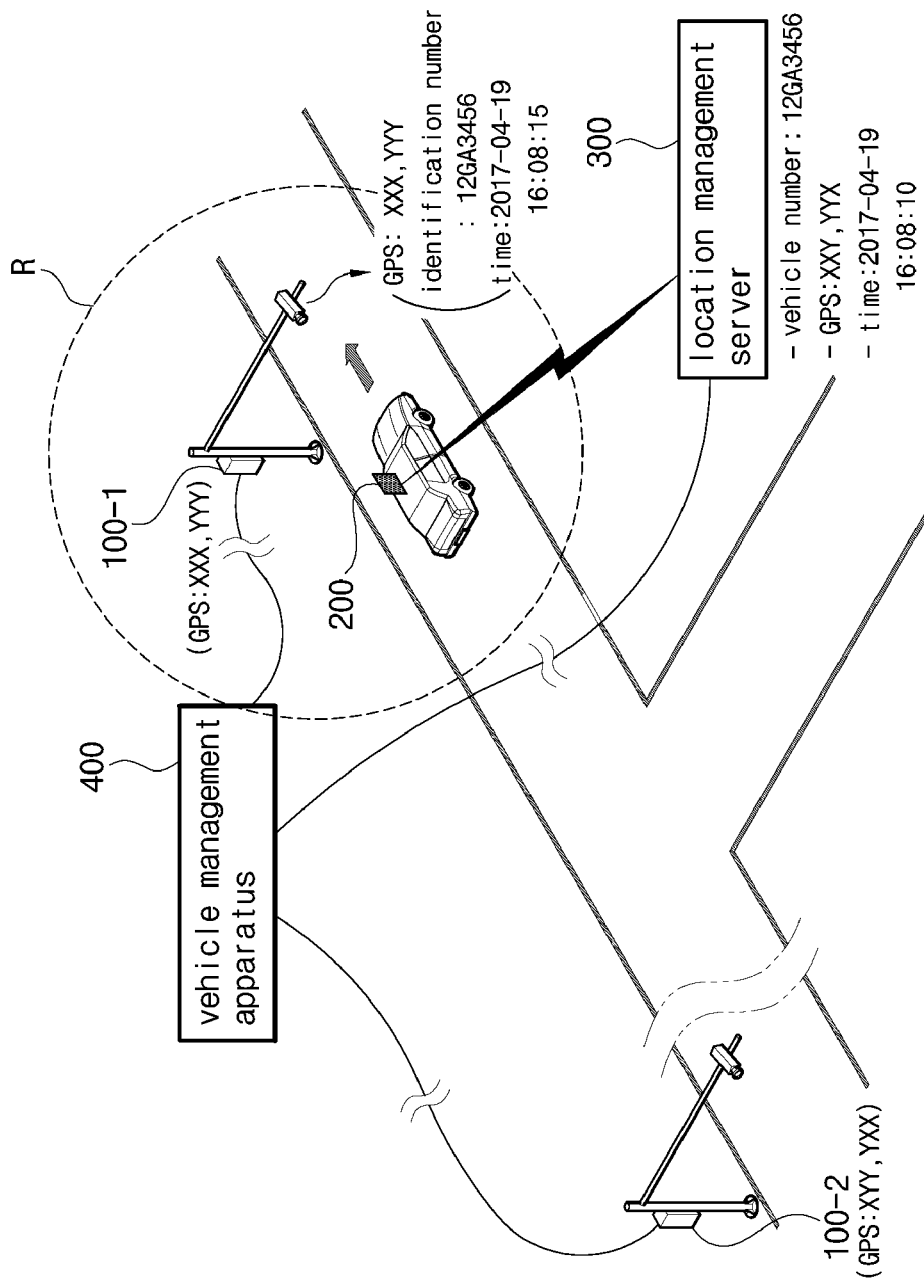

[FIG. 2]
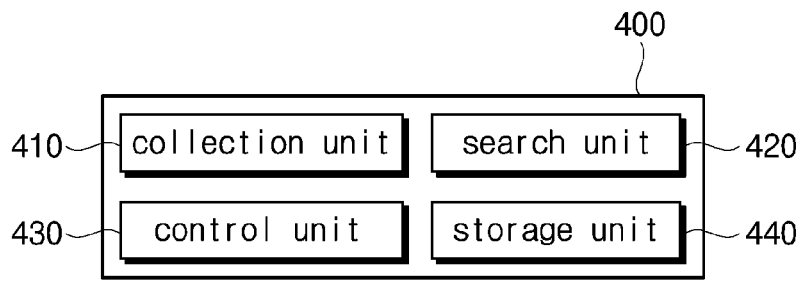

[FIG. 3]
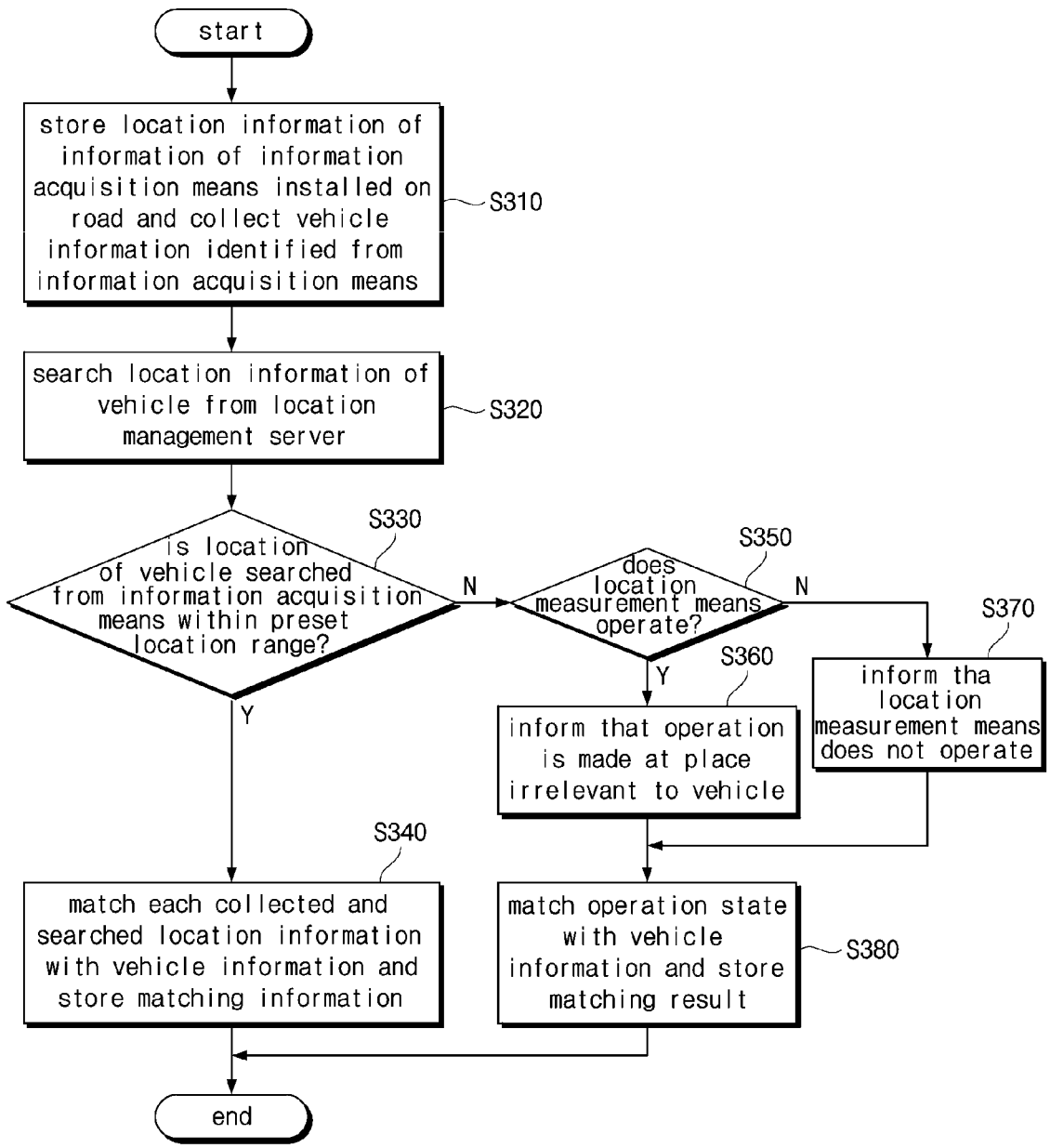

APPARATUS FOR MANAGING VEHICLE AND METHOD THEREFOR

TECHNICAL FIELD

The present invention relates to a vehicle management apparatus and a method thereof, and more specifically, to a vehicle management apparatus and a method thereof capable of easily grasping whether or not location measurement means is mounted in a vehicle or an operation state thereof.

BACKGROUND ART

Avian influenza (AI) and foot-and-mouth disease, which have become a problem recently, are a major threat to livestock farms (chicken, ducks, quails, pigs, cows, and the like) and have been generated repeatedly for many years. According to related studies, it is necessary to pay attention to the fact that a domestic propagation path of epidemic is reported to be formed in the order of a vehicle, a person, and a load, and particularly, a propagation rate caused by the vehicle is 82.7%.

The vehicle entering and exiting the livestock farm (a vehicle of a livestock-concerned person) have a variety of purposes such as feeding, a veterinarian, a shipping vehicle, nutrients, and manure processing. However, since a large number of vehicles with different purposes enter a number of the livestock farms, it is difficult to manage the propagation path including the vehicle and person, resulting in a decrease in efficiency of preventive measures and an increase in possibility of propagation and infection of epidemic.

Due to the problem, a livestock vehicle registration system is currently in operation in Korea, which mandates mounting and registration of a location measurement means (GPS terminal) for the vehicle of the livestock-concerned person.

Under implementation of the livestock vehicle registration system, a vehicle that do not have the GPS terminal mounted therein or is driven with the GPS terminal turned off will be accused or charged with a penalty. For example, a person driving a vehicle not registered or having no GPS terminal will be imprisoned for one year or less, or a fine not exceeding 10 million won will be imposed on the person, and a fine of up to 10 million won will be imposed on a person driving a vehicle that is powered off or operated without correcting an error.

The GPS terminal should always be powered on while the vehicle operates and is desirable to operate without an error. However, many cases of driving the vehicle in a state where the GPS terminal is not mounted, the GPS terminal is turned off, or the GPS terminal malfunctions have been detected.

As such, in a case where the vehicle operates without the GPS terminal or in a state where power is turned off, it is difficult to grasp a movement path of the vehicle, and an epidemiological investigation of the epidemic propagation path and the like may not be performed properly.

In fact, according to a special inspection by the Ministry of Agriculture and Food Affairs in December 2016, there were over 1,500 vehicles of livestock-concerned persons in which the faulty GPS terminal is mounted, and particularly, many cases have been found that those who drove the vehicle without identifying a failure of the GPS terminal.

As such, the current livestock vehicle registration system alone makes it difficult to grasp the current status of whether or not the GPS terminal is mounted in the vehicle and operates from the outside, and the monitoring and crackdown of a violation depend entirely on crackdown personnel including a police officer, and thus, there is a problem that it is difficult to crackdown and monitor all vehicles, crackdown efficiency is reduced, and a budget required for the crackdown is increased.

A background technology of the present invention is disclosed in Korea Patent Publication No. 2011-0134049 (published on Dec. 14, 2011).

SUMMARY OF INVENTION

Disclosure

Technical Problem

The present invention relates to a vehicle management apparatus and a method thereof capable of easily grasping and monitoring whether or not location measurement means is mounted in a vehicle or an operation state thereof for a vehicle driven on a road.

Technical Solution

According to the present invention, a vehicle management apparatus having a predetermined location measurement means, includes a collection unit that stores location information of at least one information acquisition means installed on a road and collects vehicle information on a vehicle identified from the information acquisition means, and a control unit that determines and informs whether or not location information of the vehicle is searched within a predetermined location range from the location information of the information acquisition means based on the vehicle information.

In addition, if the location information of the vehicle is searched within the location range, the control unit may match the collected and searched location information with the vehicle information and stores the matching information, and if the location information of the vehicle is not searched, the control unit may provide a predetermined notification.

In addition, if the location information of the vehicle is not searched within the location range, the control unit may determine an operation state of the location measurement means based on whether or not the location information of the vehicle is searched in a region outside the location range and provides the determination result.

In addition, the vehicle management apparatus may further include a search unit that searches for the location information of the vehicle from a location management server that manages the location information of the vehicle received from the location measurement means in real time.

In addition, the vehicle information may include at least one of identification information, identification time, a travel direction, and a vehicle speed of the vehicle.

In addition, each of the location information of the information acquisition means and the location information of the vehicle may be information measured by using at least one of a GPS (Global Positioning System), a mobile communication system, and a near field communication system.

In addition, the vehicle may include a vehicle of a livestock-concerned person, and the collection unit may collect each of the vehicle information and the location information of the information acquisition means, in a case where the vehicle of the livestock-concerned person is identified.

In addition, the vehicle management apparatus may further include a storage unit that stores at least one of an epidemic propagation history for the vehicle and a history of an operation state of the location measurement means, and the control unit may adjust a size of the location range applied to the vehicle based on the epidemic propagation history and the history of the operation state for the vehicle, in a case where the vehicle of the livestock-concerned person is identified.

In addition, the location range may include a coordinate value in which a preset location range value is expanded from the location information of the information acquisition means.

In addition, the vehicle management apparatus may further include a search unit that selects the information acquisition means corresponding to the location information of the vehicle if the location information of the vehicle and a predetermined time information is received, searches the selected information acquisition means for vehicle information corresponding to the time information, and provides the searched information.

Further, according to the present invention, a vehicle management method using a vehicle management apparatus including a predetermined location measurement means, includes a step of storing location information of at least one information acquisition means installed on a road and respectively collecting vehicle information on a vehicle identified from the information acquisition means and the location information of the information acquisition means, and a step of determining and informing whether or not location information of the vehicle is searched within a predetermined location range from the location information of the information acquisition means based on the vehicle information.

In addition, in the step of determining, if the location information of the vehicle is searched within the location range, the collected and searched location information may be matched with the vehicle information and the matching information may be stored, and if the location information of the vehicle is not searched, a predetermined notification may be provided.

In addition, in the step of determining, if the location information of the vehicle is not searched within the location range, an operation state of the location measurement means may be determined and provided based on whether or not the location information of the vehicle is searched in a region outside the location range.

In addition, the vehicle management method may further include a step of searching for the location information of the vehicle from a location management server that manages the location information of the vehicle received from the location measurement means in real time.

In addition, the vehicle information may include at least one of identification information, identification time, a travel direction, and a vehicle speed of the vehicle.

In addition, each of the location information of the information acquisition means and the location information of the vehicle may be information measured by using at least one of a GPS (Global Positioning System), a mobile communication system, and a near field communication system.

In addition, the vehicle may include a vehicle of a livestock-concerned person, and in the step of collecting information from the information obtaining means, each of the vehicle information and the location information of the information acquisition means may be collected, in a case where the vehicle of the livestock-concerned person is identified.

In addition, the vehicle management method may further include a step of storing at least one of an epidemic propagation history for the vehicle and an history of an operation state of the location measurement means, and in the step of determining, a size of the location range applied to the vehicle may be adjusted based on the epidemic propagation history and the history of the operation state for the vehicle, in a case where the vehicle of the livestock-concerned person is identified.

In addition, the location range may include a coordinate value in which a preset location range value is expanded from the location information of the information acquisition means.

In addition, the vehicle management method may further includes a step of selecting the information acquisition means corresponding to the location information of the vehicle if the location information of the vehicle and a predetermined time information is received, searching the selected information acquisition means for vehicle information corresponding to the time information, and providing the searched information.

Advantageous Effects

According to the present invention, there is an effect that whether or not location measurement means is mounted in a vehicle or an operation state thereof may be easily grasped and monitored based on whether or not location information of the vehicle is searched within a set location range from a point where the vehicle is identified on a road for a vehicle driving on the road.

In addition, according to the present invention, since information on a vehicle in which the location measurement means is inoperative is immediately notified to a manager or user, it is possible to increase monitoring and crackdown efficiencies for a vehicle requiring mandatory mounting of the location measurement means, such as a vehicle of a livestock-concerned person, and to gradually increase awareness of compliance by encouraging a user to comply with a law.

DESCRIPTION OF DRAWINGS

FIG. 1 is a diagram illustrating a vehicle management system according to an embodiment of the present invention.

FIG. 2 is a diagram illustrating an apparatus for managing a vehicle according to the embodiment of the present invention.

FIG. 3 is a diagram illustrating a method for managing the vehicle using the vehicle management system illustrated in FIG. 1.

BEST MODE FOR INVENTION

Hereinafter, embodiments of the present disclosure will be described in detail with reference to the accompanying drawings such that those skilled in the art to which the present invention belongs may easily implement.

Hereinafter, in the embodiment of the present invention, a "vehicle" may include vehicles requiring mounting of a location measurement means (for example, GPS terminal), and particularly, may include a vehicle (livestock related vehicle) entering and exiting a livestock farm.

In addition, the livestock farm may have a concept including a place (livestock house) for raising livestock, a facility including a livestock house (a farmhouse, a kennel, and the like), and a region where the livestock houses are concentrated. A livestock-concerned person may refer to a person involved in the livestock, such as livestock transportation, feed transportation, manure processing, medical care, or repair.

An embodiment of the present invention provides a vehicle management system which easily grasps whether or not location measurement means is mounted in a vehicle and an operation state thereof by using information recorded on information acquisition means installed on a road and information recorded in a location management server that manages a location of the vehicle, for a vehicle, which is required to mount the location measurement means, such as a vehicle of a livestock-concerned person.

FIG. 1 is a diagram illustrating a vehicle management system according to the embodiment of the present invention.

As illustrating in FIG. 1, the vehicle management system according to the embodiment of the present invention includes information acquisition means 100, location measurement means 200, a location management server 300, and a vehicle management apparatus 400.

First, the information acquisition means 100 is installed at each point on the road to identify vehicle information for a vehicle passing through the points. Here, the vehicle information may include at least one of vehicle identification information (for example, vehicle number, vehicle ID), identification time, a travel direction, and a vehicle speed.

The information acquisition means 100 may also acquire the vehicle information by using image capturing means such as a camera, and in addition to this, may also acquire the vehicle information by using wireless communication means such as RF (Radio Frequency), IR (Infrared Ray), Wi-Fi, and Bluetooth.

The information acquisition means 100 stores location information on an installation point and provides the location information to an vehicle management apparatus 400 to be stored therein.

In addition, in a case where the vehicle information is identified, the information acquisition means 100 may transmit the identified vehicle information and location information of the information acquisition means to the vehicle management apparatus 400.

Here, the location information of the information acquisition means 100 may mean information measured by using at least one of a GPS (Global Positioning System), a mobile communication system, and a near field communication system, and include coordinates of latitude and longitude locations.

FIG. 1 exemplifies that first information acquisition means 100-1 is located at a point (XXX,YYY), and second information acquisition means 100-2 is located at a point (XYY,YXX).

The first information acquisition means 100-1 provides the vehicle management apparatus 400 with identified vehicle number ("12GA3456"), identification time ("April 19, 16:08:15"), and identification information ("100-1").

Accordingly, the vehicle management apparatus 400 may confirm that the vehicle of 12GA3456 is identified by the first information acquisition means having identification information of "100-1" approximately April 19 at 16:08:15. At this time, since the vehicle management apparatus 400 previously stores the location information (XXX,YYY) of the first information acquisition means, the vehicle management apparatus may confirm that the vehicle is identified at the location (XXX,YYY).

The information acquisition means 100 may have a concept including vehicle information acquiring devices that are previously installed and operated on a road and may be additionally installed and operated at each point of the road as necessary.

The location measurement means 200 is mounted on each vehicle and measures location information of a vehicle by using at least one system of the GPS (Global Positioning System), the mobile communication system, and the near field communication system. Here, the location information of the vehicle may include a coordinate value for latitude and longitude locations.

The location measurement unit 200 may periodically transmit the measured location information of the vehicle to the location management server 300 by matching the location information with device identification information. Here, the location information of the vehicle may mean a concept including measurement time information in addition to the location information. In addition, the device identification information may include at least one of a unique ID of the location measurement means 200 and an identification number (for example, a vehicle number, a vehicle ID) of the vehicle.

The location management server 300 collects and manages the location information provided by the location measurement means 200 in real time through a wireless network. In addition, the location management server 300 stores and manages the location information of the vehicle received in real time from the location measurement means 200 for each vehicle.

As illustrated in FIG. 1, the location management server 300 may manage each vehicle by matching a GPS location, measurement time, and the like of the vehicle with the vehicle information and manage a movement path of the vehicle based on a location of each vehicle. In addition, the location management server 300 may match the location information of a predetermined vehicle with the vehicle information to provide to the vehicle management apparatus 400 such that the vehicle management apparatus 400 may inquire and search for the location of the predetermined vehicle.

The vehicle management apparatus 400 may be connected to the information acquisition means 100 and the location management server 300 through a wired or wireless network and transmit and receive the information.

The vehicle management apparatus 400 previously stores the location information of the information acquisition means 100 and collects vehicle information identified through the information acquisition means 100 and identification information of the information acquisition means 100. The vehicle management apparatus 400 may confirm a vehicle number, identification time, an identification location, and the like for a corresponding vehicle based on the collected information.

In addition, the vehicle management apparatus 400 may search the location management server 300 for the location information of the vehicle corresponding thereto based on the vehicle information (for example, vehicle number) collected from the information acquisition means 100. Of course, the location information of the vehicle may include location and time information as described above.

In addition, the vehicle management apparatus 400 may also select the predetermined information acquisition means 100 within a radius of the location information, based on the location information and the time information of the vehicle in preparation for a case where an unidentified vehicle appears, search the information acquisition means 100 for the vehicle information within a predetermined range, based on the corresponding time information, and provide the information.

The vehicle management apparatus 400 may determine whether or not the location measurement means 200 is mounted in the vehicle, or an operation state of the location measurement means 200 by using the information (vehicle information, location information of the information acquisition means) collected through the information acquisition means 100 and the location information of the searched vehicle from the location management server 300.

That is, the vehicle management apparatus 400 may determine whether or not the location information of the vehicle is searched within a predetermined location range R (set distance or radius) from the location information of the information acquisition means 100 based on the vehicle information (12GA3456) identified by the information acquisition means 100 and inform the manager.

FIG. 1 illustrates that the location measurement means 200 is normally installed in the vehicle and operates normally if the location information of the vehicle is searched within the predetermined location range R based on the location information of the information acquisition means 100. That is, if the location information of the vehicle inquired within a set time range (similar time section) from a time point at which the vehicle is identified is included within the predetermined location range from the identification point of the vehicle, the location measurement means 200 is determined to operates normally in the vehicle.

However, in a case where the location information of the vehicle is searched outside the predetermined location range R on the basis of the location information of the information acquisition means 100, the location measurement means 200 is determined to operate in a place other than the vehicle.

However, if the location information of the vehicle is not searched anywhere, the location measurement means 200 is determined to be in an inoperative state. Here, the inoperative state may include a state in which the location measurement means 200 is powered off, a malfunction state in which the location measurement means 200 is powered on but cannot provide the location information, and the like.

As such, the vehicle management apparatus 400 may grasp and monitor easily whether or not the location measurement means 200 is mounted on each vehicle or an operation state, based on whether or not the location information of the vehicle is searched from a location at which the vehicle is identified on the road within the set location range.

FIG. 2 is a diagram illustrating the vehicle management apparatus according to the embodiment of the present invention. As illustrated in FIG. 2, the vehicle management apparatus 400 according to the embodiment of the present invention includes a collection unit 410, a search unit 420, a control unit 430, and a storage unit 440.

First, the collection unit 410 stores location information of at least one information acquisition means 100 installed on the road and collects vehicle information of the identified vehicle from the information acquisition means 100 and the location information of the information acquisition means 100. Here, the vehicle information includes vehicle identification information, recognition time, a travel direction, a vehicle speed, and the like.

In addition, the collection unit 410 may collect the vehicle information and the location information of the information acquisition means 100 only in a case where a vehicle of a livestock-concerned person is identified. That is, the collection unit 410 may operate to collect the identified vehicle information and the location information of the information acquisition means 100 if the vehicle identified through the information acquisition means 100 matches information of the vehicle of the livestock-concerned person.

The search unit 420 may search for the location information of the vehicle from the location management server 300. Specifically, the search unit 420 may search the location management server 300 for location information on the vehicle corresponding to the vehicle information identified by the information acquisition means 100.

In addition, if the search unit 420 receives the time information and the location information of the vehicle, the search unit 420 may search the predetermined information acquisition means 100 within a radius of the corresponding location information and search and provide the vehicle information within a predetermined range from the searched information acquisition means 100 based on the corresponding time information.

The control unit 430 may determine whether or not the location information of the vehicle is searched from the location management server 300 within the set time period from an identification time point of the vehicle, or whether or not a location of the searched vehicle within the set time period is within a set location range based on the location of the information acquisition means 100. Here, the set time period may include an adjacent time period (T±a) before or after a set time a on the basis of an identification time T of the vehicle in consideration of a time error between devices, a vehicle movement, and the like.

If the location measurement means 200 is power off, the location information of the vehicle will not be searched at all, and even if the location measurement means 200 is power on, if the location measurement means 200 is not mounted in the vehicle, the location information of the vehicle may be searched at a place far away from the identification point.

The control unit 430 may determine whether or not the location information of the vehicle is searched from the location information of the information acquisition means 100 within the predetermined location range R based on the vehicle information identified by the information acquisition means 100 and the information stored in the location management server 300, and notify a manager of the determination result.

Here, the location range R may include coordinate values (A+a and B+b) in which preset longitude and latitude ranges are extended from the location information (A and B) of the information acquisition means 100. For example, in the coordinates (A+a and B+b), A means latitude, B means longitude, and a and b mean extended range values, respectively.

The control unit 430 may output the determination result through an output unit (not illustrated) or may transmit the determination result to a manager terminal (not illustrated) or a user terminal (not illustrated) corresponding to a vehicle through a wired or wireless network. Here, the determination result may include at least one of vehicle information (a vehicle number, identification time, an identification location, and the like) of the corresponding vehicle, and whether or not the location measurement means 200 is mounted in the vehicle and an operation state thereof.

At this time, the manager terminal (not illustrated) and the user terminal (not illustrated) may include terminals such as a SmartPhone, a Tablet PC, a Pad, a Notebook, a Computer, and a Server, which may be connected via a wired or wireless network to provide predetermined information. In addition, the manager terminal (not illustrated) may correspond to a manager terminal of a general disaster prevention center or a disease management headquarter for quick response when disaster or epidemic occurs.

If the location information of the vehicle is searched within the location range, the control unit 430 matches the collected location information (location information of the information acquisition means) and the searched location information (location information of the vehicle) with the vehicle information to store in the storage unit 440. As such, in a case where the location measurement means 200 is mounted in the vehicle and operates normally, the control unit 430 may store and manage the respective location information by matching with the vehicle information.

However, in a case where the location measurement means 200 is powered off and is not in operation, or in a case where the location measurement means 200 is powered on but is in malfunction, the location measurement means 200 cannot perform an operation of measuring or transmitting location information, and thereby, the location information of the vehicle is not searched at all from the location management server 300.

As such, if the location information of the vehicle is not searched, the control unit 430 provides the manager or the user with a predetermined notification corresponding thereto. Here, the predetermined notification may include information for notifying a non-operation of the location measurement means 200.

In addition, if the location information of the vehicle is not searched within the location range, the control unit 430 determines an operation state of the location measurement means 200 based on whether or not the location information of the vehicle is searched in a region outside the location range.

If the location information of the vehicle is searched in the region outside the location range, the control unit 430 determines that the location measurement means 200 is not mounted in the vehicle and operates outside the location range. However, if the location information is not searched at all, the control unit 430 determines that the location measurement means 200 does not operate.

The storage unit 440 may match and store at least one of the vehicle information and the location information collected through the information acquisition means 100, the location information searched from the location management server 300, and the determination result of the control unit 430. In addition, the storage unit 440 may store at least one of an epidemic propagation history for the vehicle of the livestock-concerned person and an history of an operation state of the location measurement unit 200.

Here, in a case where the vehicle of the livestock-concerned person is identified, the control unit 430 searches for the epidemic propagation history and the history of the operation state of the vehicle from the storage unit 440 and adjust a size of the location range applied to the vehicle based on the searched history.

If there is the epidemic propagation history within a predetermined month or there is a history of non-operation of the location measurement means 200, the control unit 430 may widen the location range applied to the vehicle by a set distance from a reference value to induce mounting and use of the location measurement means 200. In addition, the control unit 430 may return the location range back to the reference value range after an adaptation period (predetermined period) of a user.

In addition, in a case of a point (for example, a point where an average speed is greater than or equal to 80 Km/h) where an average speed is high based on an average speed of the vehicle in the information acquisition means 100, a travel distance radius per second is large, and thus, the control unit 430 may also set the location range to be wider than the preset reference value.

As described above, in a case where the vehicle is driven while the location measurement means 200 is not mounted or is in an inoperative state, a user of the vehicle may be accused of or charged with a penalty in accordance with the current law.

According to the embodiment of the present invention, it is possible to easily monitor whether or not there is a violation without on-site enforcement personnel and to immediately notify a manager or a user of the violation, and thereby, an enforcement efficiency may be increased, and awareness of compliance is increased by inducing the user to confirm mounting and operation state of the location measurement means when driving a vehicle.

FIG. 3 is a diagram illustrating a vehicle management method using the vehicle management system illustrated in FIG. 1.

As illustrated in FIG. 3, the vehicle management apparatus 400 of the vehicle management system according to the embodiment of the present invention stores location information of at least one information acquisition means 100 installed on the road and collects vehicle information on a vehicle identified from the information acquisition means 100 (S310).

Then, the search unit 420 searches the location management server 300 for the location information of a vehicle (S320).

Here, the search unit 420 may search the location management server 300 for the location information of the vehicle measured within a set time period range (±10 seconds) from an identification time point of the vehicle. Accordingly, all of the location information of the vehicle measured within time range adjacent to the identification time point of the vehicle may be searched among the vehicle location information for each time stored in the location management server 300.

Meanwhile, in preparation for a case where an unidentified vehicle appears, if the location information and time information of a predetermined vehicle is received, the search unit 420 may select the information acquisition means 100 within a radius of the location information and search the selected information acquisition means 100 for vehicle information within a predetermined range based on the corresponding time information to provide.

Thereafter, the control unit 430 determines whether or not the location information of the vehicle is searched within the predetermined location range R from the location information of the information acquisition means 100 (S330).

Here, in a case where the location information of the vehicle is searched within the location range R, the location measurement means 200 in the vehicle is determined to be in a normal operation state, but in a case where the location information of the vehicle is not searched within the location range R, the location measurement means 200 is determined to be in an inoperative state or a state where the location measurement means exists outside the location range.

As such, if the location information of the vehicle is searched within the location range R, the control unit 430 matches each of the collected and searched location information with the vehicle information and stores the information in the storage unit 440 (S340).

However, if the location information of the vehicle is not searched in the location range R, the control unit 430 determines an operation state of the location measurement means by confirming whether or not the location information of the vehicle is searched in a region outside the location range (S350).

If the location information of the vehicle is searched in the region outside the location range, the control unit 430 determines that the location measurement means 200 operates at a place irrelevant to the vehicle and notifies a manager of the corresponding matter (S360).

In addition, if the location of the vehicle is not searched even in the region outside the location range, the control unit 430 determines that the location measurement means 200 does not operate at all and notifies the manager of the corresponding matter (S370). At this time, if the location measurement means 200 does not operate at all, the corresponding matter may be informed to the user.

Thereafter, the control unit 430 matches the operation state of the location measurement means 200 with the vehicle information and stores and records the matching information (S380). As such, according to the embodiment of the present invention, a use status of the location measurement means 200 for vehicles requiring mandatory mounting and operation of the location measurement means 200 such as a vehicle of a livestock-concerned person may be monitored for each vehicle, and when there is a violation of law, the violation may be notified, or accusation or charging with a penalty may be performed.

According to the present invention described above, it is possible to easily grasp and monitor whether or not location measurement means is mounted in a vehicle or an operation state thereof based on whether or not location information of the vehicle is searched within a set location range from a point where the vehicle is identified on a road for a vehicle driving on the road.

In addition, according to the present invention, since information on a vehicle in which the location measurement means is inoperative is immediately notified to a manager or user, it is possible to increase monitoring and control efficiencies for a vehicle requiring mandatory mounting of the location measurement means, such as a vehicle of a livestock-concerned person, and to gradually increase awareness of compliance by encouraging a user to comply with a law.

Although the present invention is described with reference to the embodiments illustrated in the drawings, this is merely examples, and it will be understood by those skilled in the art that various modifications and equivalent other embodiments may be made. Therefore, the true technical protection scope of the present invention will be defined by the technical idea of the appended claims.

The invention claimed is:

1. A vehicle management apparatus including a predetermined location measurement means, comprising:
   a collection unit that stores location information of at least one information acquisition means installed on a road and collects vehicle information on a vehicle identified from the information acquisition means; and
   a control unit that determines and informs whether or not location information of the vehicle is searched within a predetermined location range from the location information of the information acquisition means based on the vehicle information.

2. The vehicle management apparatus according to claim 1,
   wherein if the location information of the vehicle is searched within the location range, the control unit matches the collected and searched location information with the vehicle information and stores the matching information, and
   wherein if the location information of the vehicle is not searched, the control unit provides a predetermined notification.

3. The vehicle management apparatus according to claim 1, wherein if the location information of the vehicle is not searched within the location range, the control unit determines an operation state of the location measurement means based on whether or not the location information of the vehicle is searched in a region outside the location range and provides the determination result.

4. The vehicle management apparatus according to claim 1, further comprising:
   a search unit that searches for the location information of the vehicle from a location management server that manages the location information of the vehicle received from the location measurement means in real time.

5. The vehicle management apparatus according to claim 1, wherein the vehicle information includes at least one of identification information, identification time, a travel direction, and a vehicle speed of the vehicle.

6. The vehicle management apparatus according to claim 1, wherein each of the location information of the information acquisition means and the location information of the vehicle is information measured by using at least one of a GPS (Global Positioning System), a mobile communication system, and a near field communication system.

7. The vehicle management apparatus according to claim 1,
   wherein the vehicle includes a vehicle of a livestock-concerned person, and
   wherein the collection unit collects each of the vehicle information and the location information of the information acquisition means, in a case where the vehicle of the livestock-concerned person is identified.

8. The vehicle management apparatus according to claim 7, further comprising:
   a storage unit that stores at least one of an epidemic propagation history for the vehicle and a history of an operation state of the location measurement means, and
   wherein the control unit adjusts a size of the location range applied to the vehicle based on the epidemic propagation history and the history of the operation state the vehicle, in a case where the vehicle of the livestock-concerned person is identified.

9. The vehicle management apparatus according to claim 1, wherein the location range includes a coordinate value in which a preset location range value is expanded from the location information of the information acquisition means.

10. The vehicle management apparatus according to claim 1, further comprising:
    a search unit that selects the information acquisition means corresponding to the location information of the vehicle if the location information of the vehicle and a predetermined time information is received, searches the selected information acquisition means for vehicle information corresponding to the time information, and provides the searched information.

11. A vehicle management method using a vehicle management apparatus including a predetermined location measurement means, the method comprising:
    a step of storing location information of at least one information acquisition means installed on a road and respectively collecting vehicle information on a vehicle identified from the information acquisition means and the location information of the information acquisition means; and a step of determining and informing whether or not location information of the vehicle is searched within a predetermined location range from the location information of the information acquisition means based on the vehicle information.

12. The vehicle management method according to claim 11, wherein in the step of determining,
if the location information of the vehicle is searched within the location range, the collected and searched location information is matched with the vehicle information and the matching information is stored, and
if the location information of the vehicle is not searched, a predetermined notification is provided.

13. The vehicle management method according to claim 11, wherein in the step of determining, if the location information of the vehicle is not searched within the location range, an operation state of the location measurement means is determined and provided based on whether or not the location information of the vehicle is searched in a region outside the location range.

14. The vehicle management method according to claim 11, further comprising:
a step of searching for the location information of the vehicle from a location management server that manages the location information of the vehicle received from the location measurement means in real time.

15. The vehicle management method according to claim 11, wherein the vehicle information includes at least one of identification information, identification time, a travel direction, and a vehicle speed of the vehicle.

16. The vehicle management method according to claim 11, wherein each of the location information of the information acquisition means and the location information of the vehicle is information measured by using at least one of a GPS (Global Positioning System), a mobile communication system, and a near field communication system.

17. The vehicle management method according to claim 11,
wherein the vehicle includes a vehicle of a livestock-concerned person, and
wherein in the step of collecting information from the information obtaining means, each of the vehicle information and the location information of the information acquisition means is collected, in a case where the vehicle of the livestock-concerned person is identified.

18. The vehicle management method according to claim 17, further comprising:
a step of storing at least one of an epidemic propagation history for the vehicle and a history of an operation state of the location measurement means, and
wherein in the step of determining, a size of the location range applied to the vehicle is adjusted based on the epidemic propagation history and the history of the operation state for the vehicle, in a case where the vehicle of the livestock-concerned person is identified.

19. The vehicle management method according to claim 11, wherein the location range includes a coordinate value in which a preset location range value is expanded from the location information of the information acquisition means.

20. The vehicle management method according to claim 11, further comprising:
a step of selecting the information acquisition means corresponding to the location information of the vehicle if the location information of the vehicle and a predetermined time information is received, searching the selected information acquisition means for vehicle information corresponding to the time information, and providing the searched information.

* * * * *